US006538880B1

(12) United States Patent
Kamijo et al.

(10) Patent No.: US 6,538,880 B1
(45) Date of Patent: Mar. 25, 2003

(54) COMPLEMENTARY FUNCTIONAL PDA SYSTEM AND APPARATUS

(75) Inventors: Noboru Kamijo, Fujisawa (JP); Kazutoshi Sugimoto, Machida (JP); Tadanobu Inoue, Yamato (JP); Junya Shimizu, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/708,275

(22) Filed: Nov. 8, 2000

(30) Foreign Application Priority Data

Nov. 9, 1999 (JP) .......................................... 11-317903

(51) Int. Cl.[7] ................................................ H05K 7/20
(52) U.S. Cl. ...................... 361/686; 361/741; 361/756; 710/102; 248/65
(58) Field of Search ................................ 361/686, 687, 361/680–683, 725–727, 741, 754, 756; D6/396, 397; D14/100, 114; 710/102; 360/97.8; 248/65

(56) References Cited

U.S. PATENT DOCUMENTS 5,664,228 A * 9/1997 Mital .......................... 395/882
5,878,282 A * 3/1999 Mital .......................... 395/882
6,188,573 B1 * 2/2001 Urita .......................... 361/687
6,205,021 B1 * 3/2001 Klein et al. .................. 361/683
6,231,371 B1 * 5/2001 Helot .......................... 439/374
6,249,427 B1 * 6/2001 Carrol ......................... 361/683

FOREIGN PATENT DOCUMENTS

| JP | 04-275612 | 10/1992 | ............. G06F/1/16 |
| JP | 06-012144 | 1/1994 | ............. G06F/1/16 |
| JP | 07-239729 | 9/1995 | ............. G06F/1/16 |
| JP | 09-101842 | 4/1997 | ............. G06F/1/16 |
| JP | 10-074119 | 3/1998 | ............. G06F/1/16 |
| JP | 10-133773 | 5/1998 | ............. G06F/1/16 |
| JP | 11-003136 | 1/1999 | ............. G06F/1/16 |

* cited by examiner

Primary Examiner—Darren Schuberg
Assistant Examiner—Hung Van Duong
(74) Attorney, Agent, or Firm—William A. Kinnaman, Jr.

(57) ABSTRACT

The constitution of the subject invention provides a new input/output apparatus that adds or complements the functions of PC mainframe when connected with PC mainframe, and operates in the same manner as a conventional PDA when detached from the PC mainframe. The input/output apparatus operates either independently or operates in concert with the PC mainframe under the conditions housed in the PC mainframe. The input/output apparatus of this invention comprises the display screen consisting of touch panels etc., display screen visible from outside even when the lid of the PC mainframe is closed, port used to exchange data when housed in the PC mainframe, and transmitter/receiver used for radio communication.

12 Claims, 7 Drawing Sheets

COMPLEMENTARY FUNCTIONAL PDA SYSTEM AND APPARATUS

BACKGROUND OF THE INVENTION

1. Field of the Invention

The subject invention relates to an input/output (I/O) apparatus including a small display apparatus that is connectable to a portable notebook PC (personal computer), the portable input/output apparatus being capable of utilizing functions and data of the notebook PC by means of a touch screen and/or voice, etc. even when the notebook PC is closed.

2. Description of the Related Art

Conventional notebook PC is equipped with a suspension function for electricity saving purposes and is readily operable for work without a trouble of switching on each time.

However, a notebook PC cannot be used under such a condition that its display apparatus such as liquid crystal display is closed when there is no other means of display available for users.

Due to aforementioned reasons, even when a user had a notebook PC with him/her a work place is needed to open the display apparatus of the notebook PC, and therefore the notebook PC is not operable when the user is driving a car, or in a crowded train, or the bag that contains the notebook PC is on a baggage rack.

Thanks to technical innovations in recent years, the notebook PC has acquired the same level of functions as a desk top, having CD-ROM and DVD, etc. built-in and being connectable with a portable phone and GPS.

There already is available such a notebook PC that enables listening to music from CD-ROM even when the display apparatus is closed and the switch is off, however, there is none that allows users to utilize functions of the entire system of the notebook PC (including the use of such additional functions of telephone, pager, and GPS etc. connected to PC).

On the other hand, conventional portable information apparatus such as PDA has been basically designed to be used independently in such a manner as to carry a necessary function of a desktop PC or a notebook PC temporarily, and/or to be connected with an information source PC via serial communication and other method when necessary to exchange necessary functions and data and used in linkage with the information source PC. Thus the function of the portable information apparatus is mainly for PIM (personal information management) and is very limited.

Being small and driven by batteries for long hours, it is difficult for the portable information apparatus to possess such additional functions as processing function of recognizing handwritten characters and voice for which CPU power is needed, telephone, pager, GPS, and a bulk storage, and it is not a proper style for providing the necessary information environment in an ideal way.

SUMMARY OF THE INVENTION

A problem that subject invention is aiming to resolve is to provide an information apparatus to enable the utilization of data in a notebook PC and/or use of its function even under such circumstances that the display apparatus of the notebook PC cannot be opened or the notebook PC is placed in a bag.

Another problem that subject invention is aiming to resolve is to provide an input/output apparatus that enables the control of functions and data including control of power supply of the mainframe apparatus, and use of the notebook PC under a condition that the display apparatus of the mainframe is closed.

Another problem that subject invention is aiming to resolve is to provide an information apparatus that enables the use of high-grade PC functions even under such conditions that the mainframe is placed somewhere nearby, e.g., the assistant driver's seat, or in a bag placed on a baggage rack, as if the user has a subset of the mainframe at hand, by making the input/output apparatus detachable and portable as a separate apparatus.

The subject invention is an input/output apparatus including a small-sized display apparatus attached on the surface or side of the notebook PC, the display apparatus being operable even when the mainframe being switched off and the input/output apparatus being housed inside of the notebook PC, and the input/output apparatus operable as an independent unit.

BRIEF DESCRIPTION OF THE DRAWINGS

FIG. 1 is a sample illustration to show how to install PC apparatus that the subject invention is applicable to.

FIG. 2 is a sample illustration to show how to install PC apparatus that the subject invention is applicable to.

FIG. 3 is a description chart to show each part of the input/output apparatus that the subject invention is applied to.

FIG. 4 is a description chart to show each part of the input/output apparatus that the subject invention is applied to.

FIG. 5 is a block chart to show major components of the in put/output apparatus that the subject invention is applied to.

FIG. 6 is a sample constitution of the display screen of the input/output apparatus that the subject invention is applied to.

FIG. 7 is a sample constitution of the display screen of the input/output apparatus that the subject invention is applied to.

FIG. 9 is a sample illustration of data communication between two sets of the input/output apparatuses that the subject invention is applied to.

FIG. 10 is a sample constitution of the display screen on the side of the input/output apparatus that the subject invention is applied to.

FIG. 11 is a chart to show the mechanism of the storage of PC apparatus that the subject invention is applied to.

DESCRIPTION OF THE PREFERRED EMBODIMENTS

Figure 1:
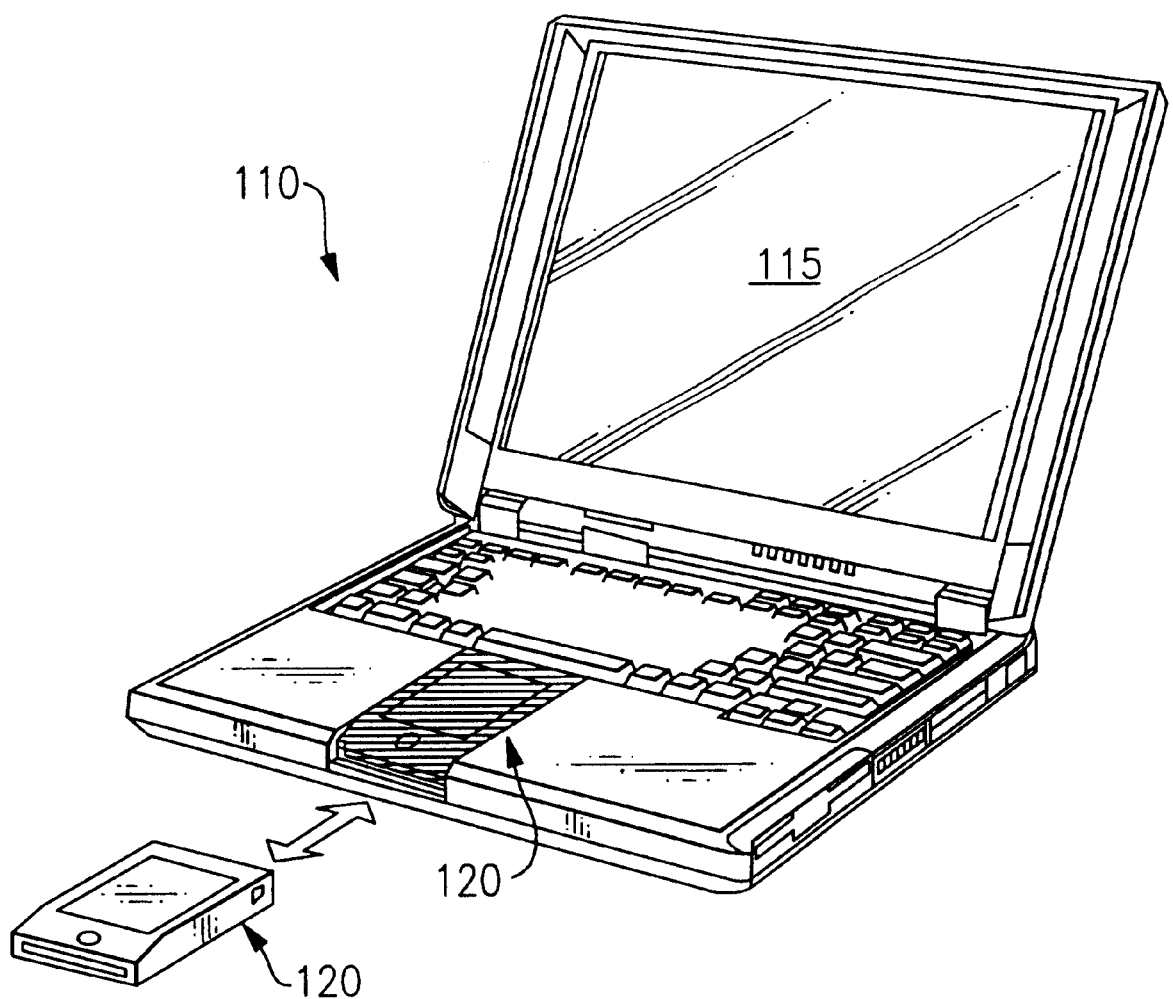

The subject invention relates to an apparatus comprising an input/output apparatus equipped with voice function including a small-sized display apparatus attached to a portable notebook PC, functions (basic PC functions, communication, telephone, CD-ROM, DVD, etc.) and data of the notebook PC being usable by such means as a touch screen and voice even when the notebook PC is closed, the input/output apparatus including display apparatus being detachable physically or portable like conventional PDA (personal digital assistants) and readily available for use as if a subset of a high-grade notebook PC is at hand. An embodiment example of the apparatus is described hereunder.

Embodiment example is not limited to this and it is deemed possible that traders concerned work out derivative apparatuses by analogy based on the concept of the subject invention.

The subject invention is an apparatus that has, on the surface or side of a conventional notebook PC, an input/output apparatus equipped with a small-sized display apparatus with a power management function independent of the power supply of the mainframe, and the apparatus has a speaker/microphone built-in that provides an input/output function by means of voice aside from input function by buttons and a touch panel.

The input/output apparatus of the invention does not necessarily have to include all of buttons, touch panel, speaker, and microphone, which may comprise items selected in accordance with the user's preference.

Under normal conditions it stays in the status of low electricity consumption mode such as suspension mode, and starts working as an input/output apparatus to activate the mainframe apparatus once input is made from outside.

It does not matter whether the mainframe apparatus is in the status of switch-off, suspension, hibernation or whatever when input is made from outside.

As for input/output of voice, it is feasible for instance to design the apparatus to have only the function of digitizing voice, and to utilize the data of the mainframe apparatus or a partial function thereof by providing data and utilizing such functions as voice recognition and/or text-to-speech of the mainframe PC without depending on the manual handling except for certain commands.

The apparatus itself is basically expected to function as just an input/output apparatus for the mainframe apparatus, however, it is also feasible to make the apparatus have memory and programs in itself in the same manner as conventional PDA so that it should operate in linkage with PIM application data of the mainframe apparatus.

Having an independent power supply, it is also operable via radio communication by means of RF, IrDA, and Bluetooth in a detached condition. In this case, it appears to be a conventional PDA, however, since it utilizes high-grade functions of the mainframe apparatus, it operates as an apparatus that has a higher grade of functions such as voice recognition that a conventional PDA was not able to perform in spite of its small size and low electricity consumption.

In the case of FIG. 1, it makes up a part of the palm rest of a notebook PC 110. The display apparatus with a large touch screen is able to function either merely as a touch pad to control a mouse pointer or as a launcher to display icons for specific applications.

It is also feasible to provide a handwriting function that is not available in the case of a notebook PC 110.

Information is displayed on a small display apparatus on the side when the display of the mainframe is closed.

By touching this part, users can activate the mainframe apparatus to utilize its functions or use a voice control function.

This input/output apparatus 120 has a power supply independent of the notebook PC 110 and it can operate even under a condition it is extracted from the mainframe PC 110.

Having a radio communication function such as RF, IrDA or Bluetooth, it can operate in the same way as it is housed in the mainframe 110 as far as it is within the communicable range.

It is also operable independently as a conventional PDA having a memory or programs within.

Figure 2:
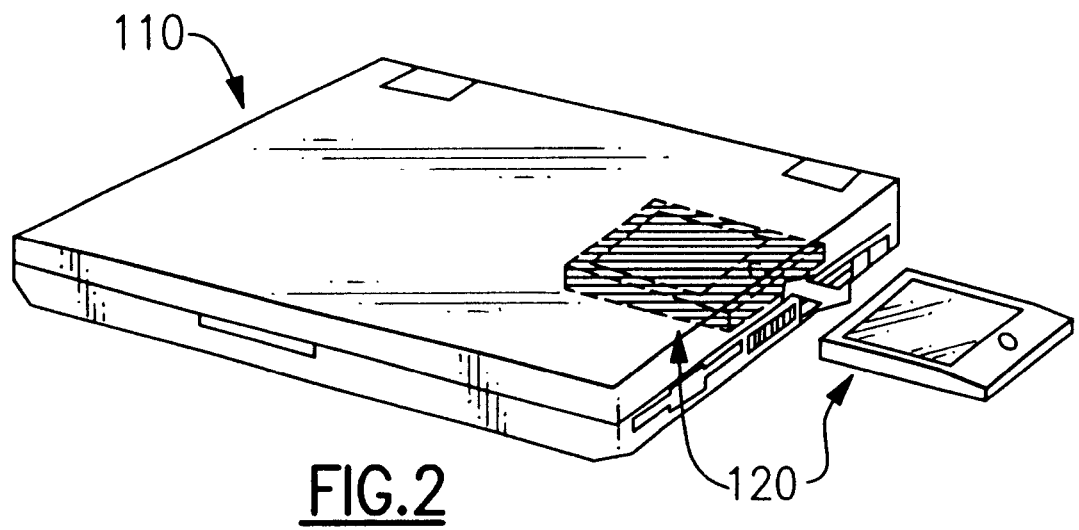

FIG. 2 shows the status that a thin input/output apparatus 120 is attached on the reverse side of the notebook PC mainframe 110, unlike the case of FIG. 1.

In the conditions of FIG. 2, it is possible to use the functions of mainframe 110 through input/output apparatus 120 even when the display apparatus of the mainframe 110 is closed.

The input/output apparatus 120 shown in FIG. 2 can be extracted from the PC mainframe 110 in the same manner as FIG. 1, and it is operable as an independent PDA even when extracted.

Figure 3:
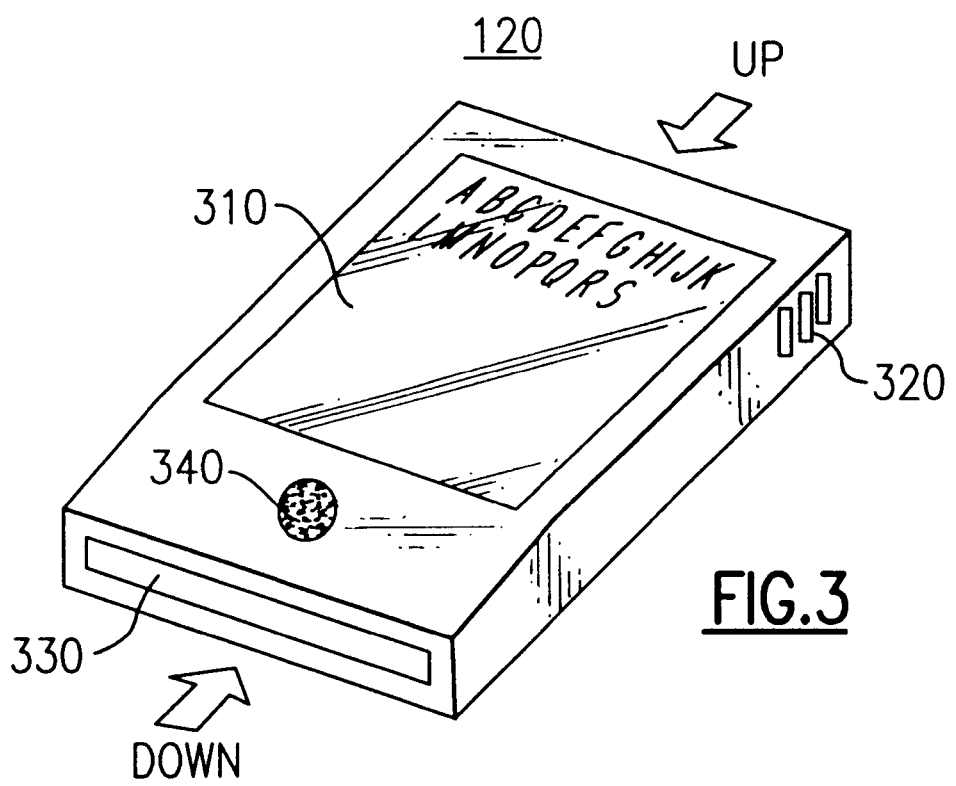

FIG. 3 shows detailed illustrations of each part as seen head-on of the input/output apparatus 120 that the subject invention described in FIG. 1 and FIG. 2 is applied to.

The input/output apparatus 120 includes a display screen 310 comprising of LDC (liquid crystal display apparatus) and the display screen 310 includes a capacitive or resistive location information detection apparatus called a touch panel or a touch screen.

Having a touch panel, the display screen 310 displays characters and image information for users and, being a pointing device, it also plays the role as the users' input means.

The input/output apparatus 120 includes microphone 340 and speaker 320, and recognizes the user's voice input through microphone 340 and is also able to reproduce voice and music through speaker 320.

The input/output apparatus 120 includes a display screen 330 on the side that is different from display screen 310.

Display screen 330 comprises LCD (liquid crystal display apparatus), etc. however, a touch screen is not indispensable.

Figure 4:
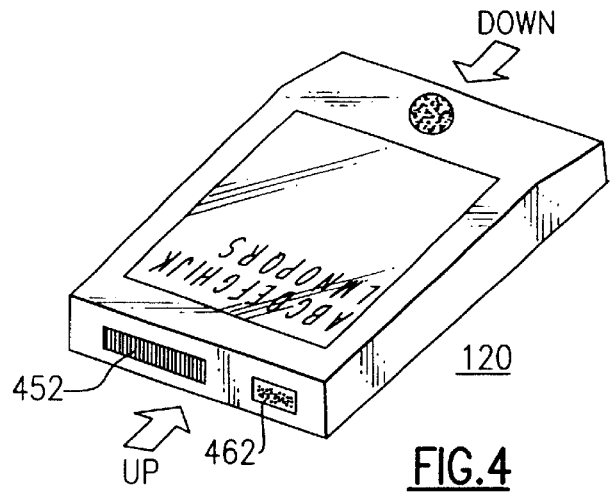

FIG. 4 shows the detailed illustration of each part of the input/output apparatus 120 shown in FIG. 3 as seen from its reverse side.

The input/output apparatus 120 includes a transmitter/receiver 462 to materialize a radio communication function by means of infrared rays and feeble radio waves.

Transmitter/receiver 462 is good for infrared ray communication such as IrDA(Infrared Data Association) or radio waves such as FM waves.

In the case of radio waves, it can be the one supporting Bluetooth or the one that materializes the communication function of portable phone or PHS.

Input/output apparatus 120 has a port 452 to materialize a wired communication function aside from radio communication function.

The port for port 452 is not limited to any specific ones, which can be a serial port, USB, or IEEE1394 and comprises connectors that meet these specifications.

When input/output apparatus 120 which the subject invention as described in FIG. 3 and FIG. 4 is applied to is used together with PC mainframe 110, voice input/output becomes available which makes manual control of the input/output apparatus 120 unnecessary, thus users can without using hands utilize the functions of mainframe apparatus 110 even when the mainframe apparatus 110 is placed in a bag, or when users are driving a car or in a crowded train.

The following applications are deemed available by the utilization of the subject invention.

Firstly, to remote-control the mainframe PC 110 by means of buttons, a touch panel, and voice through input/output apparatus 120.

Secondly, to provide a system that displays at input/output apparatus 120 mails downloaded from a mail server to the mainframe PC 110 and reads them aloud at the same time, or prepares mails based on voice data, etc. input through input/output apparatus 120 and transfers the mails.

In the above case, if a portable phone function is linked with the mainframe PC 110, transferring to and receiving from the mail server can be conducted automatically by the mainframe apparatus 110.

Thirdly, if the mainframe PC 110 or input/output apparatus 120 includes the GPS (Global Positioning System) function, it is possible to provide a system that displays maps on the screen and offers voice navigation at the same time, by connecting the input/output apparatus 120 with the mainframe apparatus 110 and setting a built-in direction sensor in the input/output apparatus 120.

Fourthly, if the PC mainframe 110 or input/output apparatus 120 includes a portable phone or PHS function, it is possible to provide a speaker phone system that automatically dials from such information as the address book displayed on the input/output apparatus 120.

In the above case, it is also possible that the mainframe apparatus 110 activates the input/output apparatus 120 upon receipt of incoming calls and notifies the incoming calls by both voice and screen.

Fifthly, it is possible to provide antitheft and/or antimislaying alarm system that activates alarms of input/output apparatus 120 if the system gets out of the range that the radio waves from the PC mainframe 110 can reach.

Sixthly, to provide a PDA that can correspond to voice input/output utilizing the functions of mainframe apparatus 110. In this case, automatic data synchronization with the mainframe apparatus 110 is possible.

Figure 5:
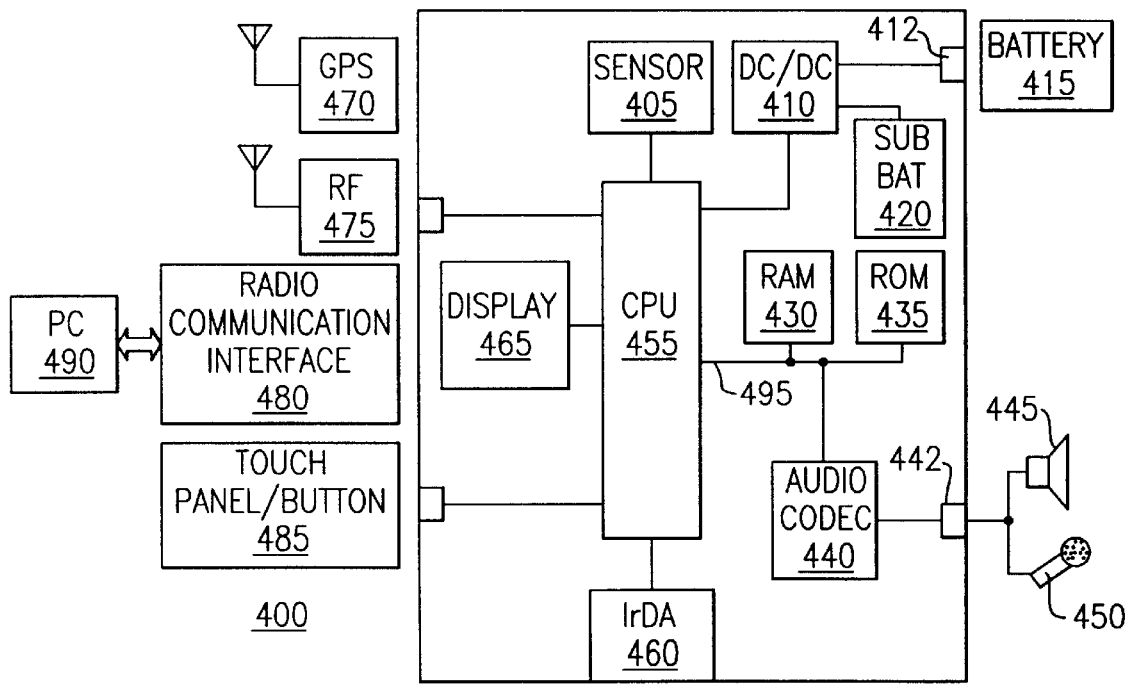

As aforementioned, it is possible to work out various system constitutions based on the subject invention, and FIG. 5 shows a system block chart that makes the basics for input/output apparatus that the subject invention is applied to.

FIG. 5 is a block chart that illustrates the basic constitution of a portable information terminal detachable from a notebook PC which, however, is not necessarily the only constitution available.

In concrete terms, the input/output apparatus 120 that the subject invention is applied to is equipped with CPU 455, wired and radio communication interfaces with notebook PC 475 and 480, battery interface 412, display apparatus interface 465, acoustic interface 442, etc. and a converter such as CODEC 440, speaker 445, microphone 450, and DC/DC 410, etc. will be installed between these interfaces and CPU if need be.

ROM 435 based on a nonvolatile memory such as RAM 430 or flash memory is placed for CPU 455.

This constitution is designed to connect these components via parallel or serial bus 495, the specification of which is not limited.

Figure 6:
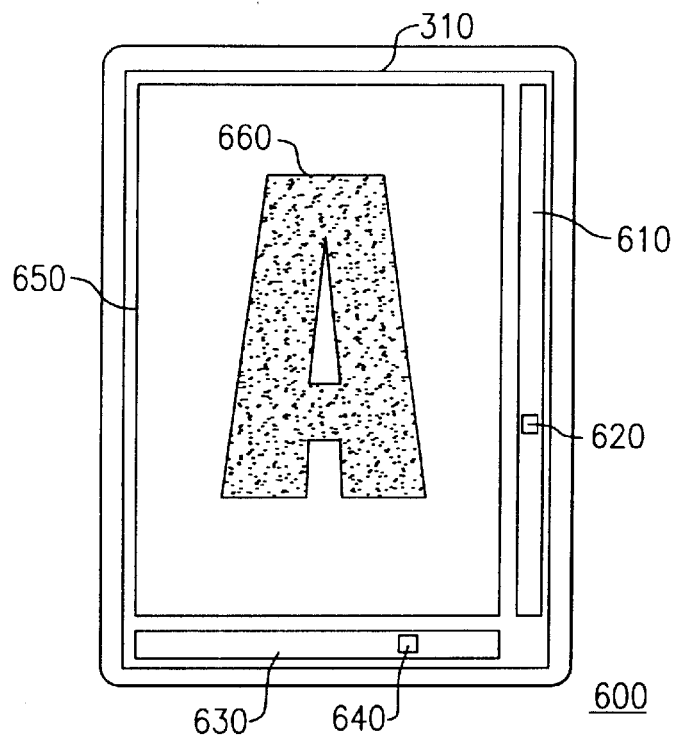

FIG. 6 is a sample constitution of the input screen of input/output apparatus 120 that the subject invention is applied to.

FIG. 6 shows a sample constitution of the screen 310 of input/output apparatus 120 which the subject invention as shown in FIG. 3 is applied to.

In FIG. 6 it is assumed that the entire display screen 310 comprises touch panels, however, the display screen 310 does not need to be touch panels as long as a user's input function is somehow made available.

On the right of the screen 310 are shown scroll bar 610 and scroll button 620 used to scroll the screen up and down.

In the lower part of the screen 310 are shown the scroll bar 630 and scroll button 640 used to scroll the screen rightward and leftward.

Users are allowed to scroll the areas displayed on the display screen 115 of the mainframe PC up and down and rightward and leftward using the up/down scroll button 620 and left/right scroll button 640.

In the screen 310 a handwriting input area 650 is provided aside from the scroll areas 610 and 630.

Users are allowed to input characters 660 with a stylus pen or other means by utilizing this handwriting input area 650, and the characters 660 input by users are recognized and processed.

In other words, in the case shown in FIG. 6 where PC mainframe 110 does not have a handwriting input function, a handwriting input function is added utilizing the handwriting input area 650 when the input/output apparatus 120 is connected with the PC mainframe, and use up/down and left/right scroll bars 610 and 630 and scroll buttons 620 and 640 to add very handy scroll functions in addition to the pointing device function originally available on the PC mainframe.

On the other hand, when input/output apparatus is used independently, the handwriting input area 650 is used as the display area, and in this case users are allowed to scroll up/down and rightward/leftward the areas displayed on the display screen 650 of the input/output apparatus itself using the up/down scroll button 610 and left/right scroll button 640.

Figure 7:
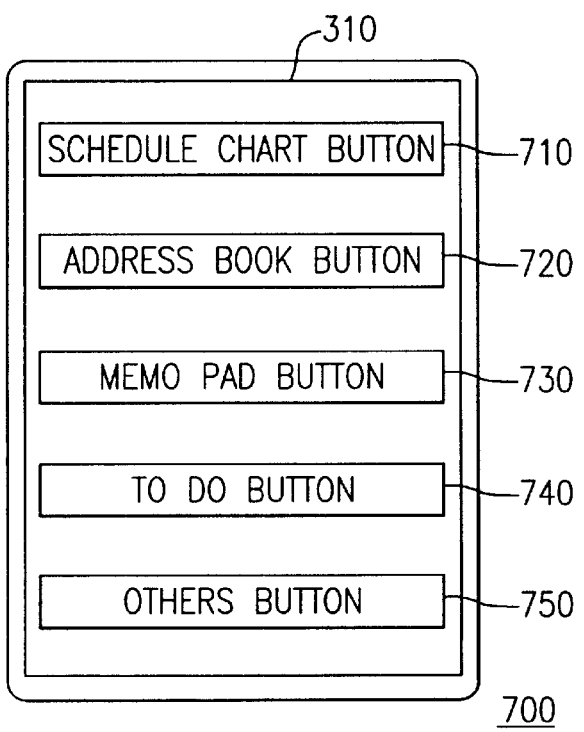

FIG. 7 shows another sample constitution different from FIG. 6 of the screen 310 of input/output apparatus 120 which the subject invention is applied to In the constitution sample shown in FIG. 7 five application call-up buttons 710 through 750 are displayed on the display screen 310.

In the case of FIG. 7 are displayed the "schedule chart button" 710 used for schedule control, "address book button" 720 used to record and search names, telephone numbers, mail addresses, etc., "memo pad button" 730 used to prepare and save memos, "to do button" 740 used to record and list up important issues, and "other button" 750 used to call up other applications.

In FIG. 7, applications often used by users in actual situations are associated with each button, however, users are allowed to change at their discretion the rules how to associate these call-up buttons 710 through 750 with applications.

When the input/output apparatus 120 of this invention is connected with the PC mainframe 110, there is a merit that users are allowed to easily activate the application they want to use by selecting each application button on the display screen 310 enjoying improved convenience compared with the mainframe PC as used on its own.

The screen constitution shown in FIG. 7 is also available as is when the input/output apparatus 120 is used alone without being connected with the PC mainframe.

Figure 8:
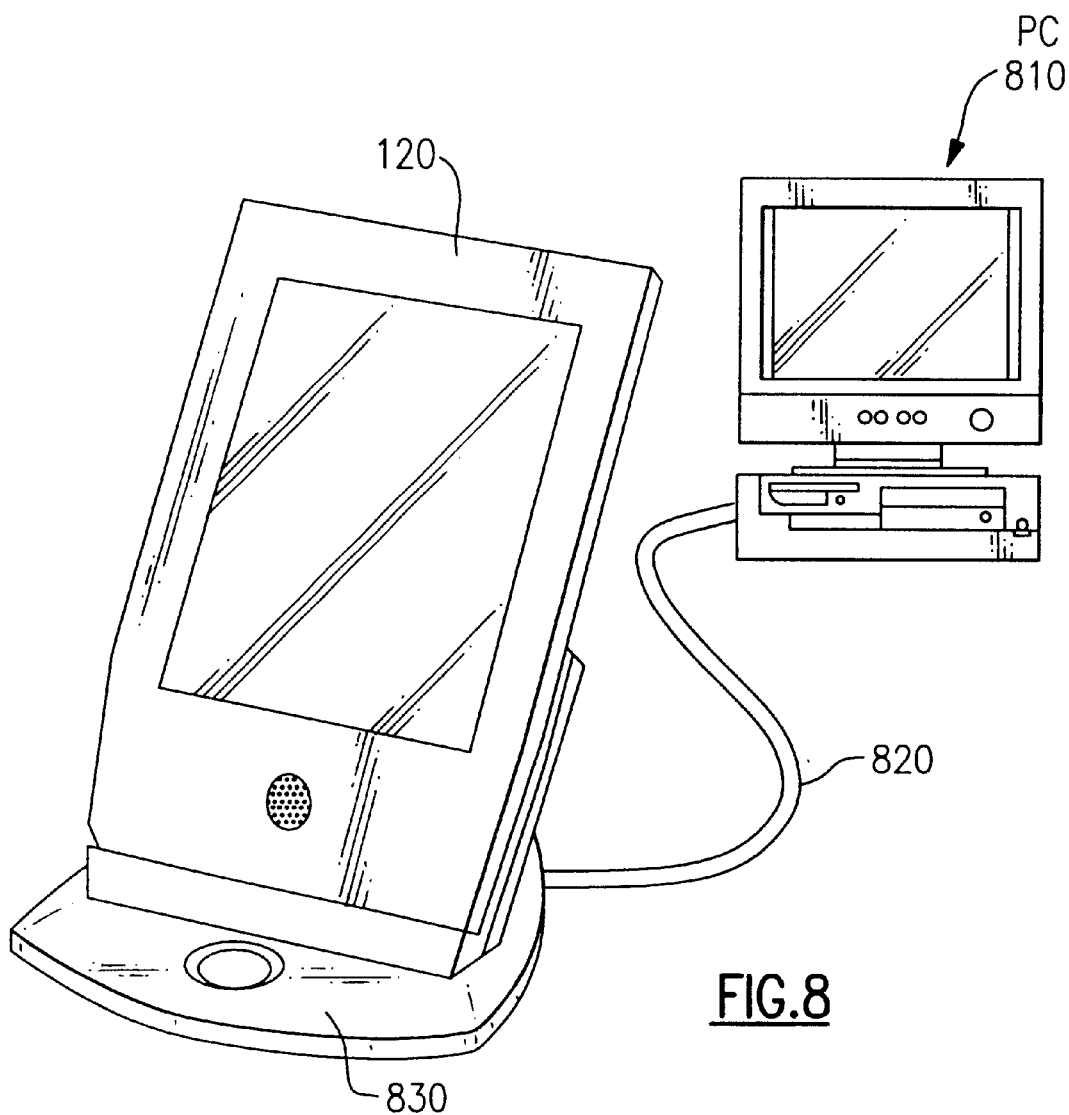
FIG. 8 is a sample illustration of connection between the input/output apparatus that the subject invention is applied to and PC.

FIG. 8 shows the conditions where the input/output apparatus 120 that the subject invention is applied to is connected with PC 810 such as a desk top model.

The input/output apparatus 120 that the subject invention is applied to is connected with the stand-type docking station 830 called a cradle.

Cradle 830 possesses a communication function and is connected with the PC mainframe 810 via communication cable 820.

Normally the cradle 830 possesses a communication function such as a serial port, and exchanges data through two-way communication with the PC mainframe 810 that is connected with the other end of the cable 820.

The input/output apparatus 120 establishes wired communication with the PC mainframe 810 using a cradle 830, and is able to secure the identity of data between the PC mainframe 810 utilizing HotSync function, etc. to meet the user's preference.

Figure 9:
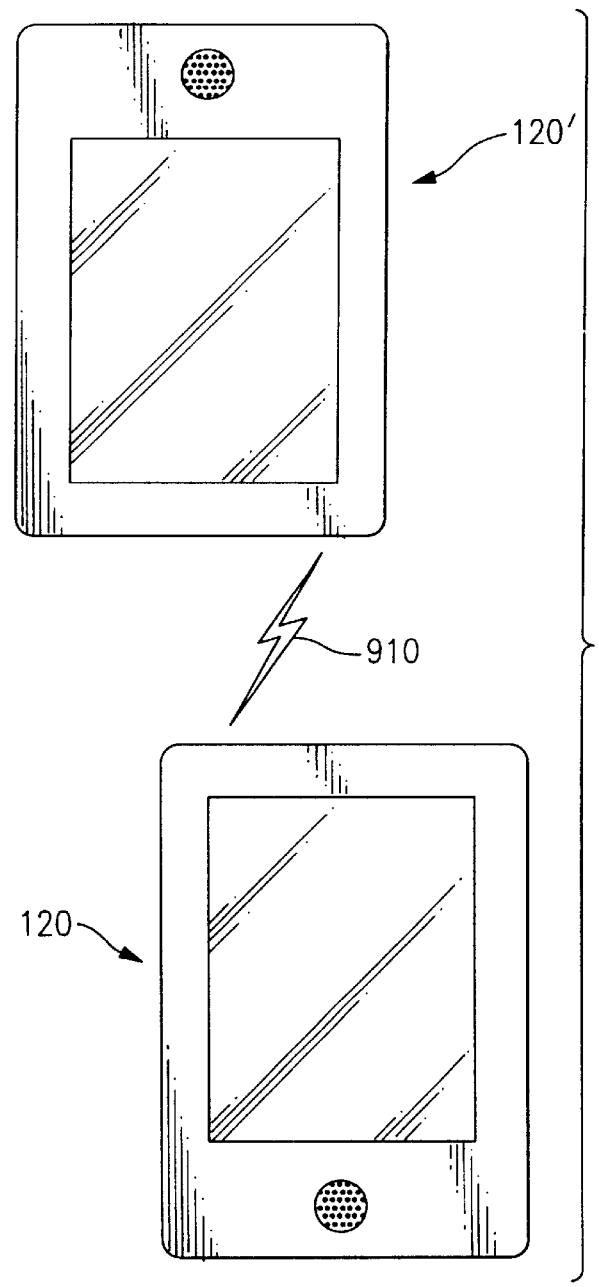

FIG. 9 shows the conditions how the data is exchanged between two sets of input/output apparatus 120 and 120' both of which the subject invention is applied to.

As described in FIG. 3, the input/output apparatus 120 that the subject invention is applied to includes a radio communication transmitter/receiver 462 used to a support radio communication function by IrDA of infrared rays and radio waves (RF).

In the case of IrDA the transmitter/receiver 462 comprises the light emitting unit and light receiving unit of infrared rays, and in the case of radio waves (RF) the transmitter/receiver 462 comprises a transmitter and an aerial for receiving waves.

Therefore, in the case of two sets of input/output apparatuses 120 and 120' that the subject invention is applied to, two-way radio communication 910 is established between them by means of infrared rays or radio waves to enable the data exchange.

Figure 10:
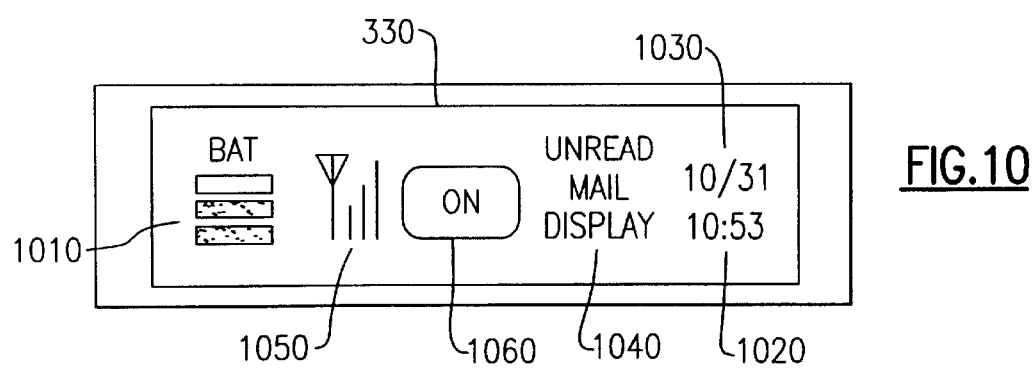

FIG. 10 shows the display screen 330 of the input/output apparatus 120 that the subject invention is applied to.

The information displayed on the side screen 330 is arranged in such a manner as to allow users' selection, however, generally speaking battery residual indicator 1010, wave strength/wave status indicator in the case of radio communication 1050, power supply status indicator (such as off, on, and sleep) 1060, indicator to show whether there are any unopened mails 1040, date indicator 1030, and time indicator 1020 will be included.

Figure 11:
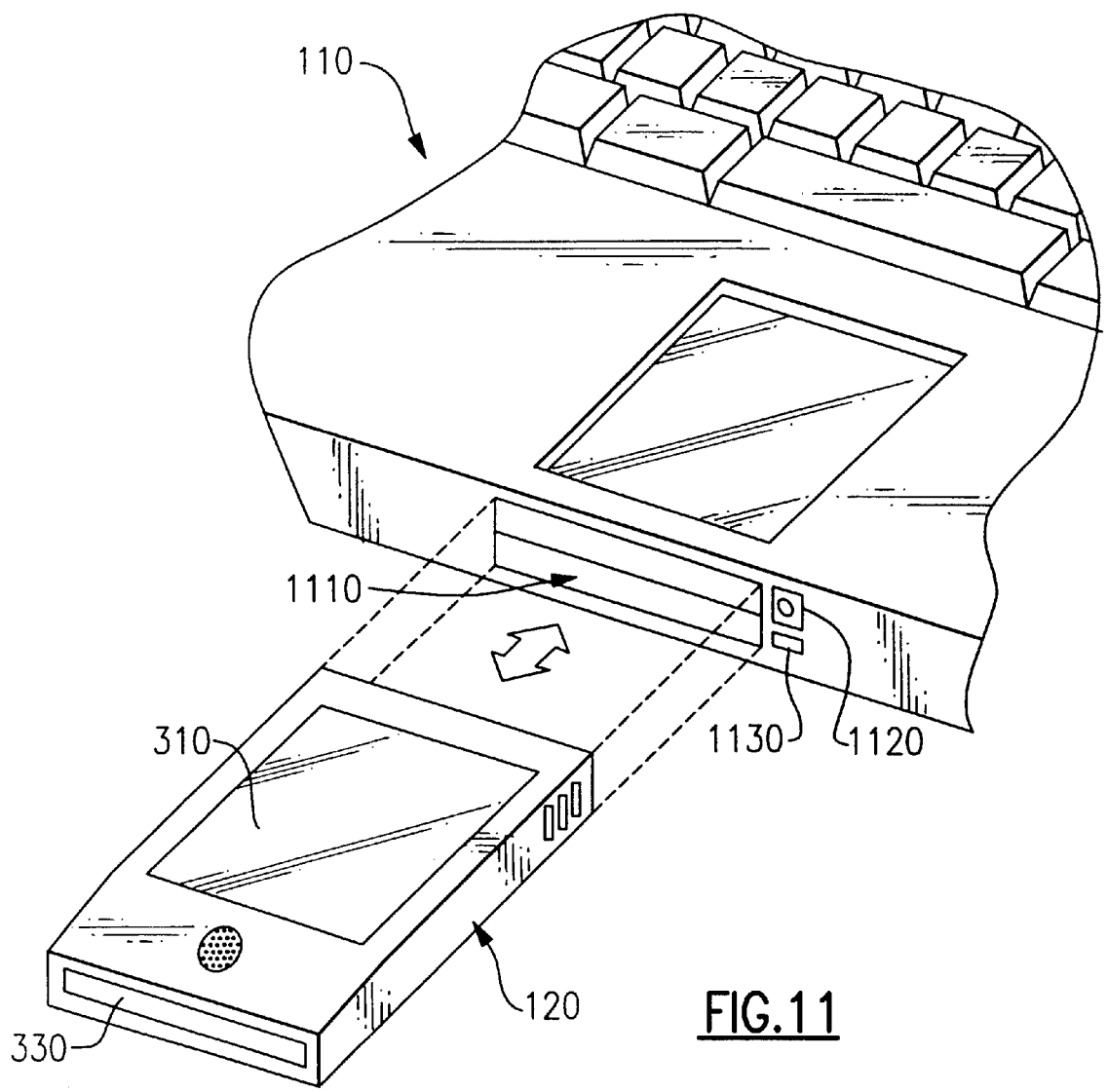

FIG. 11 shows the mechanism how the input/output apparatus 120 of this invention is housed in the PC mainframe 110.

The entrance of the storage of PC mainframe 110 where the input/output apparatus 120 is housed comprises for instance two pieces of shutter mechanisms 1110.

Two pieces of shutters, one each on upper side and lower side, of the shutter mechanism 1110 are kept open when the input/output apparatus 120 is housed inside, and are kept closed when the input/output apparatus 120 is not housed.

FIG. 11 shows the status that the shutter 1110 is closed when the input/output apparatus 120 is not housed inside.

When the input/output apparatus 120 is housed inside of the PC mainframe 110 and if the user wants to take out the input/output apparatus 120 from the PC mainframe 110, the user can take out the input/output apparatus 120 from the PC mainframe 110 by pushing the eject button.

It is possible to design the system in such a manner that the indicator 1130 comprising light emitting diode (LED), etc. turns on when the input/output apparatus 120 is engaged in the data communication with the PC mainframe 110, and in this case removal of the input/output apparatus 120 is prohibited while the indicator 1130 is turned on.

Constitution of subject invention provides a new input/output apparatus that adds and complements the functions of the PC mainframe when connected with the PC mainframe, and operates in a similar manner as a conventional PDA when detached from the PC mainframe.

As a summary other embodiment examples are described hereunder.

1. A portable computer operable either under a condition housed in another computer or by itself, the portable computer adding functions to the other computer when housed inside of the other computer.
2. A portable computer operable either under a condition housed inside of another computer or by itself, the portable computer adding input/output function to the other computer when housed inside of the other computer.
3. A portable computer operable either under a condition housed inside of another computer or by itself, a part of the display screen of the portable computer being visible from outside under a condition housed inside of the other computer, the portable computer adding functions to the other computer under a condition housed inside of the other computer.
4. A portable computer operable either under a condition housed inside of another computer or by itself, a part of the display screen of the portable computer being visible from outside under a condition housed inside of the other computer, the portable computer adding input functions to the other computer under a condition housed inside of the other computer.
5. A portable computer operable either under a condition housed inside of another computer or by itself, a part of the display screen of the portable computer being visible from outside under a conditions housed inside of the other computer, the portable computer adding pointing device functions to the other computer under a condition housed inside of the other computer.
6. A portable computer operable either under a condition housed inside of another computer or by itself, a part of the display screen of the portable computer being visible from outside under a condition housed inside of the other computer, and a part of the display screen of the portable computer being a touch panel.
7. A portable computer operable either under a condition housed inside of a notebook computer or by itself, a part of the display screen of the portable computer being visible from outside when the portable computer being housed inside of the notebook computer and the notebook computer being open, and a part of the display screen of the portable computer being visible from outside when the portable computer being housed inside of the notebook computer and the notebook computer being closed.
8. A computer capable of housing a portable computer which adds functions to the computer under a condition housed inside of the computer.
9. A system comprising computer and portable computer which can be housed inside of the computer, the portable computer operable either under a condition housed inside of the computer or by itself, the system adding functions to the computer under a condition the portable computer being housed inside of the computer.

What is claimed is:
1. A portable computer capable of receiving input from and displaying output to a user, said portable computer being operable either under a condition housed inside of another computer or by itself, said portable computer being capable of adding functions to said other computer, a part of a display of said portable computer being visible from outside when said portable computer is housed inside of said other computer.

2. The portable computer of claim 1, said portable computer being capable of adding functions to said other computer under a condition housed inside of said other computer.

3. The portable computer of claim 1 in which said functions comprise an input/output function.

4. A portable computer capable of receiving input from and displaying output to a user, said portable computer being operable either under a condition housed inside of another computer or by itself, a part of a display of said portable computer being visible from outside when said portable computer is housed inside of said other computer.

5. The portable computer of claim 4, said portable computer adding an input function to said other computer under a condition housed inside of said other computer.

6. The portable computer of claim 4, said portable computer adding a pointing device function to said other computer when housed inside of said other computer.

7. The portable computer of claim 4 in which a part of a display screen of said portable computer is a touch panel.

8. The portable computer of claim 4 in which said other computer is a notebook PC.

9. The portable computer of claim 8 in which a part of a display screen of said portable computer is visible from outside when said portable computer is housed inside of said notebook PC and said notebook PC is open.

10. The portable computer of claim 8 in which a part of a display screen of said portable computer is visible from outside when said portable computer is housed inside of said notebook PC and said notebook PC is closed.

11. A mainframe computer capable of housing a portable computer which adds functions to said mainframe computer when said portable computer is housed inside of said mainframe computer, said portable computer being capable of receiving input from and displaying output to a user and operable either under a condition housed inside of said mainframe computer or by itself, a part of a display of said portable computer being visible from outside when said portable computer is housed inside of said mainframe computer.

12. A system comprising a mainframe computer and a portable computer which can be housed inside of said mainframe computer, said portable computer being capable of receiving input from and displaying output to a user and being operable under a condition housed inside of said mainframe computer or by itself, and said system adding functions to said mainframe computer under a condition housed inside of said mainframe computer, a part of a display of said portable computer being visible from outside when said portable computer is housed inside of said mainframe computer.

* * * * *